Dec. 11, 1951  A. RUBEN  2,578,646
DISH HOLDER
Filed Sept. 11, 1951
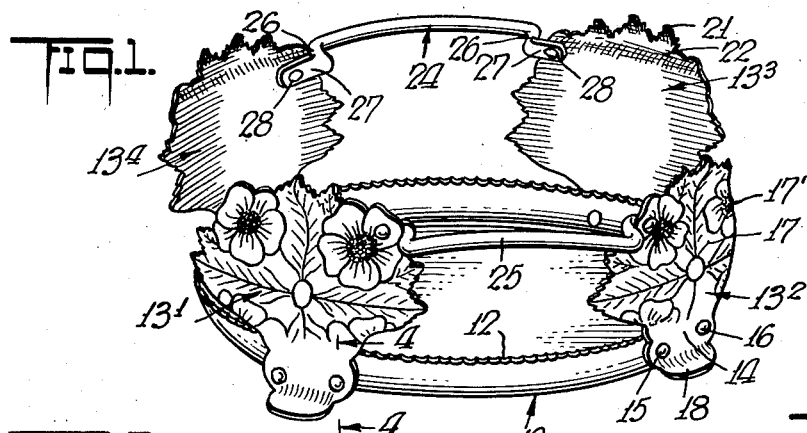
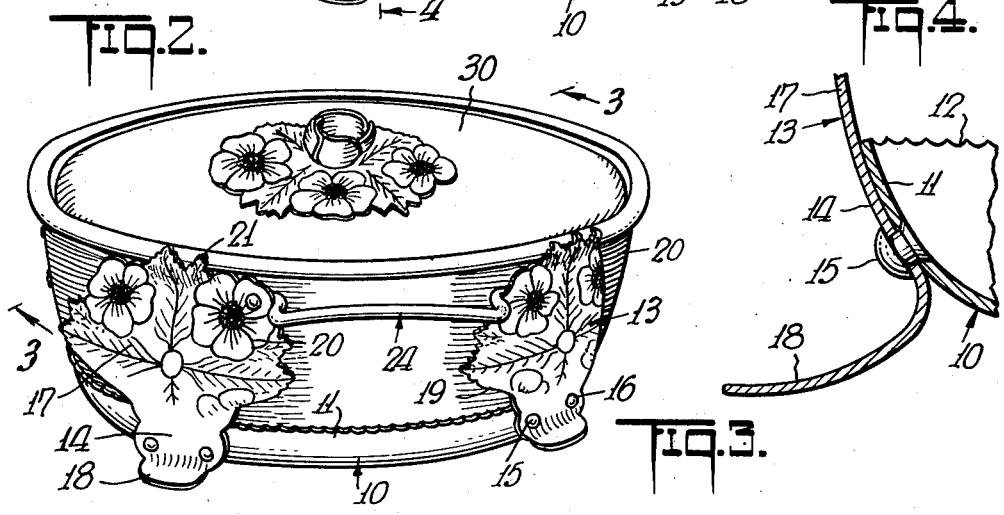
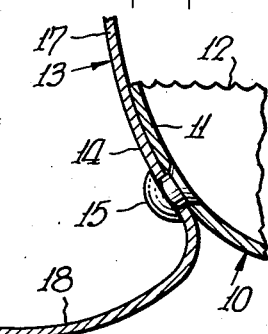
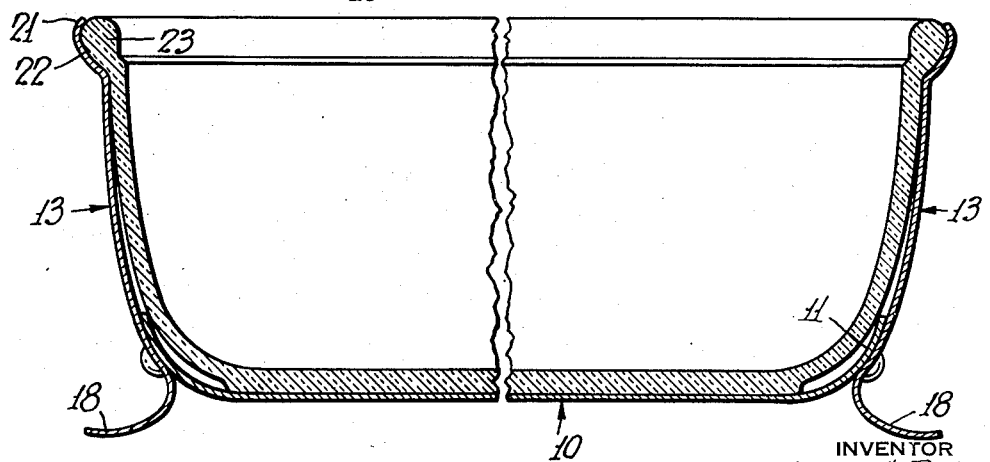
INVENTOR
August Ruben
BY
Dean Fairbank & Hirsch
ATTORNEYS Patented Dec. 11, 1951

2,578,646

UNITED STATES PATENT OFFICE 2,578,646

DISH HOLDER

August Ruben, Brooklyn, N. Y., assignor to Continental Silver Co. Inc., a corporation of New York Application September 11, 1951, Serial No. 246,093

9 Claims. (Cl. 65—61)

It is among the objects of the invention to provide a dish holder or carrier of simple and inexpensive construction, which securely retains the dish spaced from the table on which it rests and yet admits of ready removal of the dish from the holder without manipulation of screws, slides or the like, and by which portions of the dish are exposed to view in a harmonious unitary design complementary to that of the holder, even though the dish itself be of conventional, non-decorative type.

According to the invention, two or more identical members of stiff sheet material, desirably sheet metal, are firmly attached to the rim of a base member, desirably, each by a pair of rivets, each of said members having a dish retaining portion rising from the base and a foot portion below the bse.

Desirably said members are arranged in one or more opposed pairs on the periphery of the base member and each pair serves resiliently and removably to clasp the dish or other article therebetween. To this end according to another feature of the invention, the dish holder may be slightly resilient, a result obtained by forming the base of sheet metal such as aluminum with a peripheral flange, preferably in the form of a continuous rising rim, to which each of said members is attached so that said rim will flex slightly under the pressure of the corresponding dish or other article when introduced between opposed said members, or by slight resilience of said members themselves, or by slight resilience both in the rim of the base and in the said members. By such arrangement there is afforded a secure, stable assembly in which the dish is spaced by the legs from the supporting table or ledge, whereby the holder will not drop from the dish, should the dish rather than the holder, be grasped for lifting it from the table.

For added security, if desired, each of said members may desirably have inturned ornamental lugs at the top thereof to snap over a peripheral bead, rim or rib on the dish.

According to another feature, especially desirably where the dish is circular, handles intervene between adjacent edges of consecutive members and are connected thereto at outturned flattened ends thereof, preferably by rivets.

According to the invention, the holder which is of the utmost simplicity, comprising as it does in its preferred embodiment, nothing more than a sheet metal base and a plurality of desirably opposed pairs of identical ornamental sheet metal members, each formed unitary with a supporting foot and riveted to the rim of the base, affords a holder of adequate strength and utility at a cost less than that of an openwork or basket type holder, and which, by exposing to view between consecutive members, parts of a conventional dish, renders the assembly of such dish within the holder highly appealing and decorative.

In the accompanying drawings in which is shown one or more of several embodiments of the invention, Fig. 1 is a perspective view of an embodiment of the invention, illustratively shown as a casserole holder, Fig. 2 is a similar view showing the appearance of the holder, casserole and cover as assembled;

Fig. 3 is a transverse sectional view on a larger scale, with parts broken away, taken on line 3—3 of Fig. 2, and Fig. 4 is a fragmentary sectional detail view, taken on line 4—4 of Fig. 1, and on a larger scale.

Referring now to the drawings, there is shown a base 10, illustratively circular in contour, of stiff sheet material, preferably of sheet aluminum or like sheet metal, with a flange, preferably a continuous upturned rim 11, illustratively with a serrated edge 12, as shown, for ornamental effect.

Members 13 of stiff sheet material, preferably stampings of sheet aluminum or like sheet metal, which are identical in size, shape and surface design, and therefore stamped by resort to a single die, are firmly assembled, preferably to the rim 11 of the base member 10, as by welding or soldering thereto near the lower end thereof, at stem portion 14, but in practice each of such stem portions is attached to the rim of the base by rivets, desirably by two headed rivets 15 and 16.

The blank of each member 13 desirably has a wider or upstanding dish retaining portion 17 rising from the stem portion 14, well above the rim of the base and a narrower short foot portion 18, depending from the stem portion and extending below the base.

Preferably the dish-retaining portion 17 is considerably wider than the stem portion and its edges 19 flare outwardly and upwardly symmetrically from said stem portion, in any suitable ornamental contour. The face of the disk-retaining portion may have surface decoration 17' which may be engraved in the form of leaves, flowers or other ornamental motif, or it may be plain and geometrical according to taste and fashion.

Preferably the foot portion below the stem portion 14 is considerably narrowed at its foot extremity 18 which is curved outwardly, as shown, to afford a rounded rest for the unit.

Each member 13 is desirably conformed to the shape of the rim 11 and the contour of the dish to be held by the dish-retaining portion 17. For the casserole holder illustratively shown in the drawings, the member 13 is thus slightly curved to this end about its median line.

While for certain purposes three equidistant members 13 are sufficient to afford a stable three-point foot rest, especially for smaller embodiments of the invention, the embodiment shown in the drawing presents four such members arranged in two opposed pairs, 13', 13², 13³ and 13⁴, such four members being illustratively shown equidistant about the periphery of the base member so that the conventional dish of the size to be accommodated in the holder will be lodged between opposing pairs of such members.

To afford resiliency for the preferred clasping action, the members 13 do not extend vertically, but slope very slightly so as to be wedged about their rivet mounts 15, 16 as a pivot outward to a very limited degree as the dish is inserted therebetween. To this end, either the upturned rim 11 of the base or the member 13 or both yield slightly under the thrust of the dish being inserted, thus to attain the desired frictional engagement of the holder about the dish when resting upon the base 10. The continuous or uninterrupted base rim 11 enhances the security of the resilient hold as will be obvious, even though relatively thin stock is used, and the curvature of the members 13 enhances their longitudinal stiffness though such thin stock is used, and no hoop or binder at the upper part of the holder is required.

Desirably as shown, the upper edge of each member 13 is formed with small lugs 21, illustratively shown as points of leaf elements of design which points are bent inwardly slightly as shown, the band area immediately below such lugs being curved outwardly radially of the dish holder at 22, thereby to afford a cradle for the rim 23 of the dish shown, the points 21 snapping over such rim and thereby affording in addition to or instead of the frictional hold set forth, a positive engagement for the rim. Of course such engagement could be with a peripheral bead or ledge rather than the rim of the dish, where that dish protrudes above the holder.

In the embodiment shown, a pair of diametrically opposed handles 24 are rigidly affixed to the holder. Each handle is shown with a curved length 25 and short legs 26 with outturned flattened toes 27, extending along the inner face of consecutive members 13' and 13² near the upper ends of the neighboring lateral edges of dish-retaining portions 17 thereof, and riveted thereto as at 28. Where, as indicated, four members 13', 13², 13³ and 13⁴ are equidistant, the two handle members thus attached will be diametrically opposed to each other. By the arrangement disclosed, the dish 20 when in place resting upon base 10, will engage and press radially outward the toe ends 27 of the respective handles 24 for frictional engagement therewith, and may also engage the inner faces of the respective dish-retaining portions 17.

By the arrangement described, there is afforded an extraordinarily simple and inexpensive dish holder comprising a number of identical stampings 13, each simply riveted to the rim 11 of a base stamping 10 and each including a dish-retaining portion and a foot portion.

By this simple and inexpensive construction, a conventional dish, though devoid of special ribs or protrusions will yet securely and frictionally fit between the encompassing dish-engaging members, the feet of which maintain the dish raised from the table or other support. The holder does not hamper the use of a conventional ornamental dish cover 30. Even with a holder devoid of the handles shown, were the rim of the dish grasped in order to lift the assembly, the holder would be frictionally retained thereon without dropping therefrom. Yet the dish may readily be withdrawn from the holder for cleaning.

An unusually rich appearance is afforded by the invention, in that the exposed portions of the conventional, undecorated dish harmonize with and complement the design of the holder.

The specific embodiment shown is only one of numerous modes of carrying out the principle of the invention. By way of example, the base may be oval or square instead of round, for accommodating correspondingly shaped dishes, or in rectangular embodiments may accommodate a set or sequence of dishes. The invention lends itself to embodiments including the casserole dish holder shown, bread basket holders, candy dish holders, condiment holders, lamp shade holders, coffee pot holders, vase holders, and water pitcher holders, among countless other possible applications.

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A dish holder comprising a base having a peripheral flange, a plurality of substantially identical upright dish-retaining elements each rigidly affixed at spaced intervals substantially in face-to-face relation against said flange, each of said dish-retaining elements being a unitary piece of relatively stiff, resilient sheet material extending upwardly of said base and transversely conformed to substantially the shape of a conventional rigid dish resting upon said base, said holder having slight resilience for releasably clasping said dish between such dish-retaining members.

2. The dish holder recited in claim 1, in which each of said dish-retaining members has as a unitary part thereof, a foot portion extending below said base.

3. A dish holder comprising a sheet metal base having a peripheral flange, a plurality of substantially identical sheet metal dish-retaining members rigidly affixed near the respective lower ends thereof and at spaced intervals to the periphery of said base, each of said dish-retaining members rising from said base and conformed both in height and in width substantially to the shape of the side wall of a conventional dish, the bottom of which rests upon said base, each of said dish-retaining members having integral therewith a foot portion extending below said base, said holder having slight resilience for releasably clasping said dish between said dish-retaining members.

4. A dish holder comprising a sheet metal horizontal base having a continuous peripheral flange extending out of the plane thereof, a plurality of substantially identical ornamental members of sheet metal, each having a stem portion near the lower end thereof rigidly affixed to said flange, each of said sheet metal members including a dish-engaging portion rising from said stem portion and said base and an outturned foot portion depending from said stem portion and extending below said base, said sheet metal members being at spaced intervals and arranged in opposed pairs for resiliently and removably clasping wall portions of a dish member therebetween.

5. A dish holder comprising a sheet metal base having a rim, a plurality of identical ornamental members of sheet metal, each having a stem portion riveted to said rim, each of said members including a dish-engaging portion rising from said stem portion and said base, and an outturned foot portion depending from said stem portion and extending below said base, said members being arranged in opposed pairs for resiliently and removably clasping wall portions of a dish therebetween, each of said members being wider at the region above said stem portion than at said foot portion, said wider portion being curved laterally for conformation to the wall of such dish.

6. A dish holder comprising a sheet metal base having a rising rim, a plurality of substantially identical members, each comprising a one-piece sheet metal stamping, said members being arranged in spaced relation about and rigidly affixed near the respective lower ends thereof to said rim, each of said lateral members having a dish-retaining portion rising from said rim and a foot portion extending below said base, each of said dish-retaining portions being curved outwardly to conform to an outwardly protruding peripheral part of such dish, said holder having slight resilience for releasably clasping such dish between said dish-retaining portions, and each of said latter portions having its upper extremity turned inward to snap over such outwardly protruding dish portion.

7. A dish holder comprising a horizontal sheet metal base having a peripheral flange, a plurality of upright sheet metal members arranged in opposed pairs and rigidly affixed to said flange, consecutive members being spaced from each other peripherally of said base and of the dish to rest thereon, each of said members having a transversely curved dish-retaining portion rising above said flange and having a foot portion curved outward below said base, said holder having limited resilience for clasping between said members a dish resting upon said base.

8. A dish holder comprising a base having an upwardly extending continuous rim, a plurality of substantially identical, upright, transversely curved members of sheet metal spaced about said rim, each of said members having a stem portion engaging the outer face of said rim, a pair of rivets securing each stem portion to said rim, each of said members having a dish-retaining portion extending above said rim substantially the entire area of said dish-retaining portion being conformed to engage a dish resting upon said base and each member having a foot portion extending below said base, said holder affording slight resilience for releasable clasping engagement of said retaining portions with such dish.

9. The combination recited in claim 8, in which the base is circular and the dish-retaining portions are arranged in opposed pairs and in which opposed handle members intervene between adjacent sides of adjacent said portions, the ends of said handle being affixed to the corresponding retaining portions.

AUGUST RUBEN.

REFERENCES CITED

The following references are of record in the file of this patent:

UNITED STATES PATENTS

| Number | Name | Date |
| --- | --- | --- |
| D. 23,967 | Atwood | Jan. 29, 1895 |
| 144,913 | Matthews | Nov. 25, 1873 |
| 190,352 | Mulligan | May 1, 1877 |
| 254,947 | Fisher | Mar. 14, 1882 |
| 260,470 | Fisher | July 4, 1882 |
| 358,688 | Nassauer | Mar. 1, 1887 |
| 399,870 | Gaskill | Mar. 19, 1889 |
| 514,205 | Timberlake | Feb. 6, 1894 |
| 1,139,579 | Rike | May 18, 1915 |
| 1,464,652 | Green | Aug. 14, 1923 |
| 1,492,884 | Lambrecht | May 6, 1924 |
| 1,750,568 | Carew | Mar. 11, 1930 |
| 1,769,324 | Simmons | July 1, 1930 |
| 1,924,011 | Willmott | Aug. 22, 1933 |

FOREIGN PATENTS

| Number | Country | Date |
| --- | --- | --- |
| 4,136 | Great Britain | Apr. 1, 1885 |
| 6,740 | Great Britain | Mar. 26, 1908 |
| 14,346 | Great Britain | Oct. 11, 1915 |
| 26,701 | Great Britain | Dec. 21, 1905 |
| 179,357 | Great Britain | May 11, 1922 |
| 267,982 | Italy | Sept. 28, 1929 |
| 413,744 | Germany | Sept. 23, 1924 |